(12) United States Patent  (10) Patent No.: US 8,554,006 B2
Suzuki  (45) Date of Patent: Oct. 8, 2013

(54) IMAGE PROCESSING APPARATUS, FILTER DEVICE, METHODS OF CONTROLLING SAME AND COMPUTER PROGRAMS THEREFOR

(75) Inventor: Masaki Suzuki, Cambridge, MA (US)

(73) Assignee: Canon Kabushiki Kaisha, Tokyo (JP)

( * ) Notice: Subject to any disclaimer, the term of this patent is extended or adjusted under 35 U.S.C. 154(b) by 860 days.

(21) Appl. No.: 12/603,234

(22) Filed: Oct. 21, 2009

(65) Prior Publication Data

US 2010/0111424 A1    May 6, 2010

(30) Foreign Application Priority Data

Nov. 4, 2008   (JP) .................................. 2008-283728

(51) Int. Cl.
  *G06K 9/40*   (2006.01)
  *G06K 9/36*   (2006.01)

(52) U.S. Cl.
  USPC .......................................... 382/266; 382/252

(58) Field of Classification Search
  USPC .................. 382/266, 264, 261, 260, 252, 199
  See application file for complete search history.

(56) References Cited

U.S. PATENT DOCUMENTS

| 6,463,182 | B1   | 10/2002 | Onishi et al. |
| 6,636,645 | B1 * | 10/2003 | Yu et al. ........................ 382/268 |
| 7,031,552 | B2 * | 4/2006  | Kim .............................. 382/275 |
| 7,561,752 | B2 * | 7/2009  | Monobe et al. ............... 382/268 |

FOREIGN PATENT DOCUMENTS

| JP | 09-186993   | 7/1997 |
| JP | 2001-245179 A | 9/2001 |

* cited by examiner

*Primary Examiner* — Yon Couso

(74) *Attorney, Agent, or Firm* — Cowan, Liebowtiz & Latman, P.C.

(57) ABSTRACT

Provided are an image processing apparatus and method of controlling same for detecting, in pixel units, an edge that exists prior to encoding, thereby protecting an edge that exists prior to encoding and reducing noise produced by encoding. To accomplish this, the image processing apparatus compares a threshold value generated from quantization information of each pixel when decoding is performed, and the absolute values of differences between a pixel of interest and pixel peripherals thereto, detects, in pixel units, an edge that existed prior to encoding, and corrects only noise produced by encoding.

9 Claims, 10 Drawing Sheets

IMAGE PROCESSING APPARATUS, FILTER DEVICE, METHODS OF CONTROLLING SAME AND COMPUTER PROGRAMS THEREFOR

BACKGROUND OF THE INVENTION

1. Field of the Invention

The present invention relates to an image processing apparatus having a filter device, which is for removing noise in an encoded image, and a decoding device that uses the filter device, the filter device, methods of controlling the image processing apparatus and filter device, and computer programs for controlling the image processing apparatus and filter device.

2. Description of the Related Art

There is a known image processing apparatus in which a filter processing device is provided on the output side of a decoding device in order to remove encoding noise produced when an image signal is subjected to compressive encoding. For example, the specification of Japanese Patent Laid-Open No. 09-186993 proposes an image processing apparatus in which generated noise is classified into block noise and mosquito noise and the strength of a filter is adjusted adaptively in accordance with the noise. A further image processing apparatus known in the art adjusts filter strength more accurately by utilizing a particular characteristic, namely that of these two types of noise, mosquito noise is produced in the vicinity of the image edge.

In the image processing apparatus described above, inverse quantization and an inverse orthogonal transformation are carried out after encoded data is decoded. Furthermore, filter processing is executed in order to remove quantization noise that has been produced by the inverse quantization and inverse orthogonal transformation. In filter processing, an edge map is generated utilizing a preset threshold value and mosquito noise produced in the vicinity of the image edge is reduced using the edge map.

However, the conventional technique set forth above has certain problems. For example, an image that has been encoded contains an edge that was present prior to encoding and an edge produced by encoding noise. In other words, in order to improve image quality, it is necessary that these two edges be classified precisely and that only encoding noise be removed.

In the prior art described above, however, a range of threshold values utilized in edge detection is decided empirically and therefore it is difficult to quantitatively measure what the edge map will be. In such cases, for example, there are instances where a false edge produced by encoding is detected erroneously as an edge that existed before encoding was performed. If erroneous detection occurs, low-pass filtering will be applied to the vicinity of this edge. Consequently, a problem which arises is that the resolution of the image after noise reduction is diminished more than is necessary.

SUMMARY OF THE INVENTION

The present invention enables realization of an image processing apparatus in which an edge that exists prior to encoding is detected in pixel units, thereby protecting an edge that exists prior to encoding and reducing noise produced by encoding, a filter device, methods of controlling this apparatus and device, and the related computer programs.

One aspect of the present invention provides an image processing apparatus comprising: a decoding unit that decodes encoded image data; a quantization error calculating unit that acquires quantization information, which relates to quantization when the decoding unit decodes the image data, and calculates pixel-by-pixel quantization error; an edge map generating unit that generates an edge map, which represents whether or not each pixel is an edge portion, using the decoded image data and the calculated quantization error; a determination unit that determines whether or not noise is included in a pixel of interest that is to be processed, using the generated edge map; and a correction unit that corrects the image data of a pixel of interest which has been determined to include noise by the determination unit.

Another aspect of the present invention provides a filter device comprising: an edge map generating unit that generates an edge map, which represents whether or not each pixel is an edge portion, using image data and quantization information of the image data; a determination unit that determines whether or not noise is included in a pixel of interest that is to be processed, using the generated edge map; and a correction unit that corrects the image data of a pixel of interest which has been determined to include noise by the determination unit.

Still another aspect of the present invention provides a method of controlling an image processing apparatus, comprising: a decoding step of decoding encoded image data; a quantization error calculating step of acquiring quantization information, which relates to quantization when the image data is decoded at the decoding step, and calculating pixel-by-pixel quantization error; an edge map generating step of generating an edge map, which represents whether or not each pixel is an edge portion, using the decoded image data and the calculated quantization error; a determination step of determining whether or not noise is included in a pixel of interest that is to be processed, using the generated edge map; and a correcting step of correcting the image data of a pixel of interest which has been determined to include noise at the determination step.

Still yet another aspect of the present invention provides a method of controlling a filter device, comprising: an edge map generating step of generating an edge map, which represents whether or not each pixel is an edge portion, using image data and quantization information of the image data; a determination step of determining whether or not noise is included in a pixel of interest that is to be processed, using the generated edge map; and a correcting step of correcting the image data of a pixel of interest which has been determined to include noise at the determination step.

Yet still another aspect of the present invention provides a computer program for causing a computer to execute each step in the method of controlling the image processing apparatus.

Still yet another aspect of the present invention provides a computer program for causing a computer to execute each step in the method of controlling the filter device.

Further features of the present invention will become apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Example for Comparison Purposes>

Figure 10:
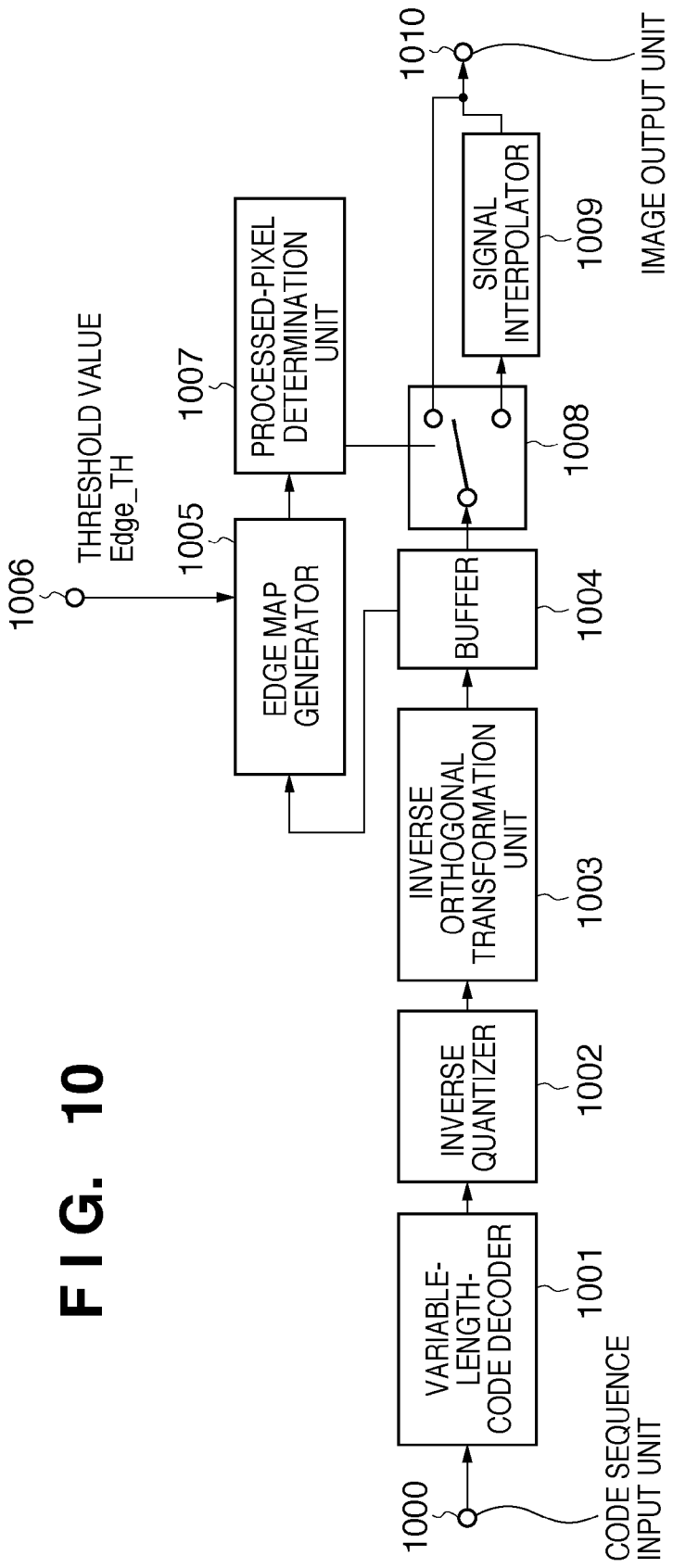
FIG. 10 is a diagram illustrating the configuration of an image processing apparatus for decoding encoded data and executing filter processing as post-processing.
Figure 11:
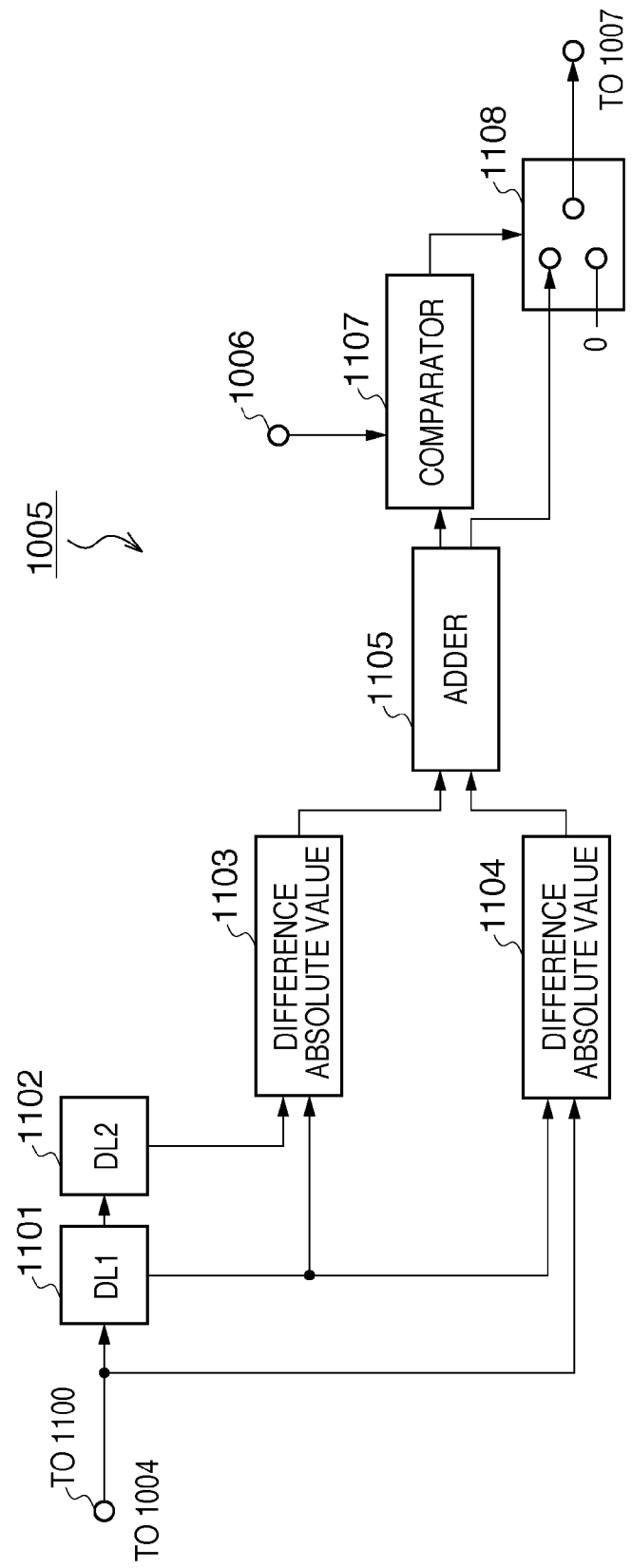
FIG. 11 is a diagram illustrating the configuration of an edge map generator.

First, an image processing apparatus serving as an example for comparison with the present invention will be described with reference to FIGS. 10 and 11. FIG. 10 is a diagram illustrating the configuration of an image processing apparatus for decoding encoded data and executing filter processing as post-processing.

As shown in FIG. 10, encoded data is input from a code sequence input unit 1000 and is decoded by a variable-length-code decoder 1001. The decoded data is inverse-quantized by an inverse quantizer 1002 based upon quantization information that was set at the time of encoding, an inverse orthogonal transformation is applied by an inverse orthogonal transformation unit 1003 and the resultant data is then written to a buffer 1004. The digital image data that has been written to the buffer 1004 includes quantization noise produced by the inverse quantizer 1002 and the inverse orthogonal transformation unit 1003. For this reason, the digital image data that has accumulated in the buffer 1004 is subjected to filter processing.

By utilizing a preset threshold value Edge _TH, an edge map generator 1005 generates an edge map from the data that has accumulated in the buffer 1004. By utilizing data from the edge map generator 1005, a processed-pixel determination unit 1007 outputs logical "1" if an edge value corresponding to a pixel of interest is zero and an edge exists in the vicinity thereof, and outputs logical "0" otherwise. A switching unit 1008 controls the digital image data that has accumulated in the buffer 1004 and, if the output from the processed-pixel determination unit 1007 is "1", switches the connection destination of the signal line in such a manner that a pixel to be processed and peripheral information will be transmitted to a signal interpolator 1009. If the output of the processed-pixel determination unit 1007 is "0", however, then the switching unit 1008 changes over the connection destination of the signal line in such a manner that the pixel to be processed is output to an image output unit 1010 without being processed. The signal interpolator 1009 applies low-pass filtering to the signal transmitted from the switching unit 1008.

Next, the details of the edge map generator 1005 will be described with reference to FIG. 11, which is a diagram illustrating the configuration of the edge map generator 1005. The digital image data that has accumulated in the buffer 1004 is input to the edge map generator 1005 in the order of the raster. Delay elements DL1 (1101) and DL2 (1102) each apply a delay of one pixel. A pixel of interest, which will undergo filtering, is stored in the delay element DL1. A signal at a pixel that is one pixel to the right of the pixel of interest is stored at input terminal 1100. A signal at a pixel that is one pixel to the left of the pixel of interest is stored in the delay element DL2. Thus, the edge map generator 1005 is so arranged that reference can be had to pixels at three horizontal taps.

Difference absolute value computation circuits 1103, 1104 compute the absolute values of the differences between the pixel of interest and the two pixels on the left and right sides thereof. The results of these operations performed by the difference absolute value computation circuits 1103, 1104 are added by an adding circuit 1105. A threshold value for an output from the adding circuit 1105 is input to an input terminal 1006. A comparison circuit 1107 outputs "0" if the value input thereto is less than the threshold value and outputs "1" if the input value is equal to or greater than the threshold value. A selection switch 1108 outputs zero if the input from the comparison circuit 1107 is "0" and outputs the input from the adding circuit 1105 as is if the input from the comparison circuit 1107 is "1". As a result, an edge map corresponding to the pixels can be generated. By virtue of this arrangement, mosquito noise produced in the vicinity of an edge is reduced.

Thus, with this image processing apparatus serving as an example for comparison purposes, a range of threshold values utilized in edge detection is decided empirically and therefore it is difficult to quantitatively measure what the edge map will be. As a consequence, there are instances where an edge that existed prior to encoding is detected erroneously as noise introduced by encoding and is removed. In other words, with the image processing apparatus serving as an example for comparison purposes, a necessary edge is removed and there is a decline in the resolution of the image after noise reduction.

In order to solve this problem, the image processing apparatus according to this embodiment is characterized in that an edge that exists prior to encoding is detected in ideal fashion, this pre-existing edge is protected and noise introduced by encoding is removed in an ideal manner. The image processing apparatus according to this embodiment will be described below with reference to FIGS. 1 to 8.

<First Embodiment>

Figure 1:
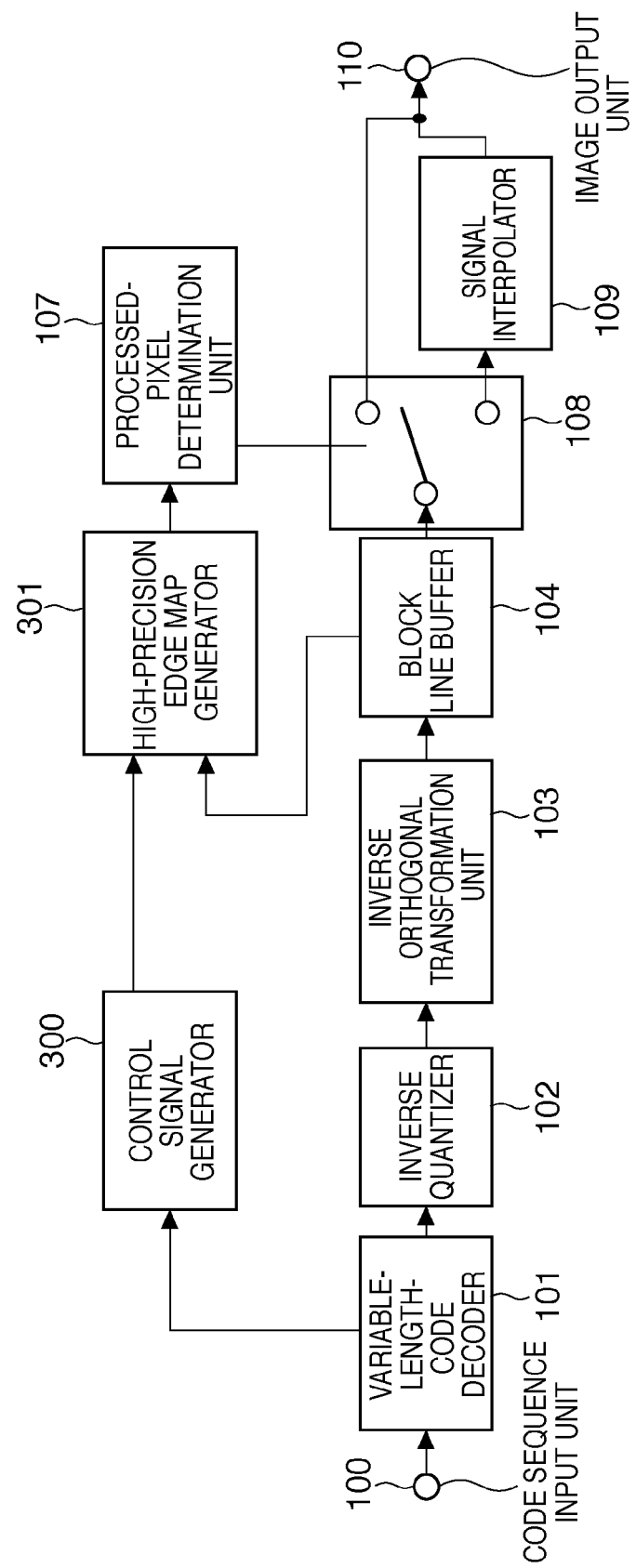
FIG. 1 is a diagram illustrating an example of the configuration of an image processing apparatus according to a first embodiment of the present invention.

The configuration of an image processing apparatus according to a first embodiment of the present invention will be described with reference to FIGS. 1 to 6 and FIG. 12. FIG. 1 is a diagram illustrating an example of the configuration of the image processing apparatus according to the first embodiment. This embodiment will be described with regard to an improvement in the image quality of an image subjected to block compressive encoding resembling that of the JPEG standard utilizing an orthogonal transformation, quantization and entropy encoding. However, another encoding scheme may be used so long as the encoded image is one that undergoes an orthogonal transformation and quantization. For example, the encoding scheme may be a hybrid encoding scheme such as MPEG2 or MPEG4. It should be noted that the arrangement described below indicates part of the configuration of the image processing apparatus. Accordingly, this image processing apparatus may be constructed with the inclusion of other elements as well.

As shown in FIG. 1, encoded data is input from a code sequence input unit 100 and is decoded by a variable-length-code decoder 101. The decoded data is inverse-quantized by an inverse quantizer 102 based upon quantization information that was set at the time of encoding, an inverse orthogonal transformation is applied by an inverse orthogonal transformation unit 103 and the resultant data is then written to a block line buffer 104. The digital image data that has been written to the block line buffer 104 includes quantization noise produced by the inverse quantizer 102 and the inverse orthogonal transformation unit 103. For this reason, the digital image data that has accumulated in the buffer 104 is subjected to filter processing. A control signal generator 300 functions as quantization error calculation means, acquires quantization-related information from the variable-length-code decoder 101, calculates pixel-by-pixel quantization errors and outputs the calculated errors to a high-precision edge map generator 301.

Figure 12:
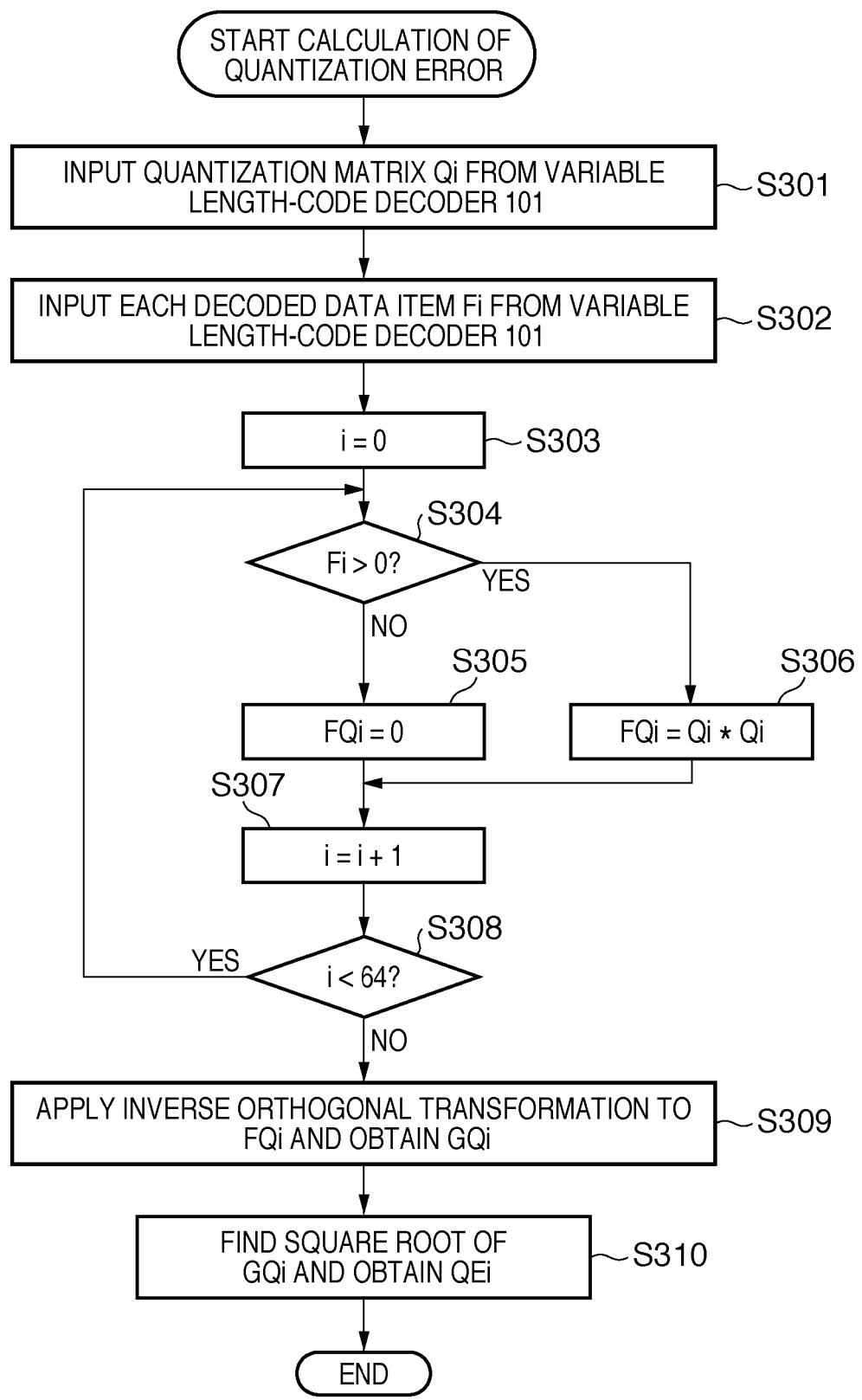
FIG. 12 is a flowchart illustrating processing executed by a control signal generator 300 according to the first embodiment.

The processing executed by the control signal generator 300 will be described in detail. FIG. 12 is a flowchart of processing executed by the control signal generator 300. At step S301, the control signal generator 300 acquires a one-dimensional array Qi (i=0 to 63) of a quantization matrix, which was used at the time of encoding, from the variable-length-code decoder 101. Although block size is described here as being 8×8, this does not impose any limitation upon block size. At step S302, the control signal generator 300 acquires a one-dimensional array Fi (i=0 to 63), which is the result of one block of quantization, obtained upon being decoded by the variable-length-code decoder 101.

At step S303, an index i representing the position of the one-dimensional array is initialized to zero. At step S304, the quantization result Fi and zero are compared, control proceeds to step S306 if Fi is greater than zero and to step S305 otherwise. At step S305, zero is substituted into quantization maximum square error FQi and then control proceeds to step S307. At step S306, the square of the value Qi of the quantization matrix is found and substituted into the quantization maximum square error FQi. Control then proceeds to step S307. At step S307, 1 is added to the index i. At step S308, it is determined whether or not the index i is less than 64. If the result of the determination is that the index i is less than 64, control proceeds to step S304 and processing continues. If the result of the determination is that the index i is equal to or greater than 64, control proceeds to step S309. At step S309, the quantization maximum square error FQi is subjected to an inverse orthogonal transformation as a two-dimensional array and maximum square error GQi is calculated. At step S310, the square root of the maximum square error GQi is found, quantization error QEi is calculated and processing is terminated.

The quantization error QEi is input to the high-precision edge map generator 301 as quantization errors QE1, QE2, QE3 in correspondence with the pixel positions.

The high-precision edge map generator 301 generates an edge map, which represents whether or not each pixel is an edge portion, from the signal output by the control signal generator 300 and the data that has accumulated in the block line buffer 104. Using the data from the high-precision edge map generator 301, a processed-pixel determination unit 107 outputs logical "1" if the edge value corresponding to the pixel of interest is zero and an edge exists at least at one peripheral pixel situated in the vicinity of the pixel of interest. Otherwise, the process pixel determination unit 107 outputs logical "0".

A switching unit 108 changes over the connection destination of the signal line in order to control the output destination of the digital image data that has accumulated in the block line buffer 104. More specifically, if the output from the processed-pixel determination unit 107 is "1", the switching unit 108 switches the connection destination of the signal line in such a manner that a pixel to be processed and peripheral information will be transmitted to a signal interpolator 109. If the output of the processed-pixel determination unit 107 is "0", however, then the switching unit 108 changes over the connection destination of the signal line in such a manner that the pixel to be processed is output to an image output unit 110 without being processed. The signal interpolator 109 applies low-pass filtering to the signal transmitted from the switching unit 108. It should be noted that the high-precision edge map generator 301, processed-pixel determination unit 107, switching unit 108 and signal interpolator 109 correspond to a filter device.

Figure 2:
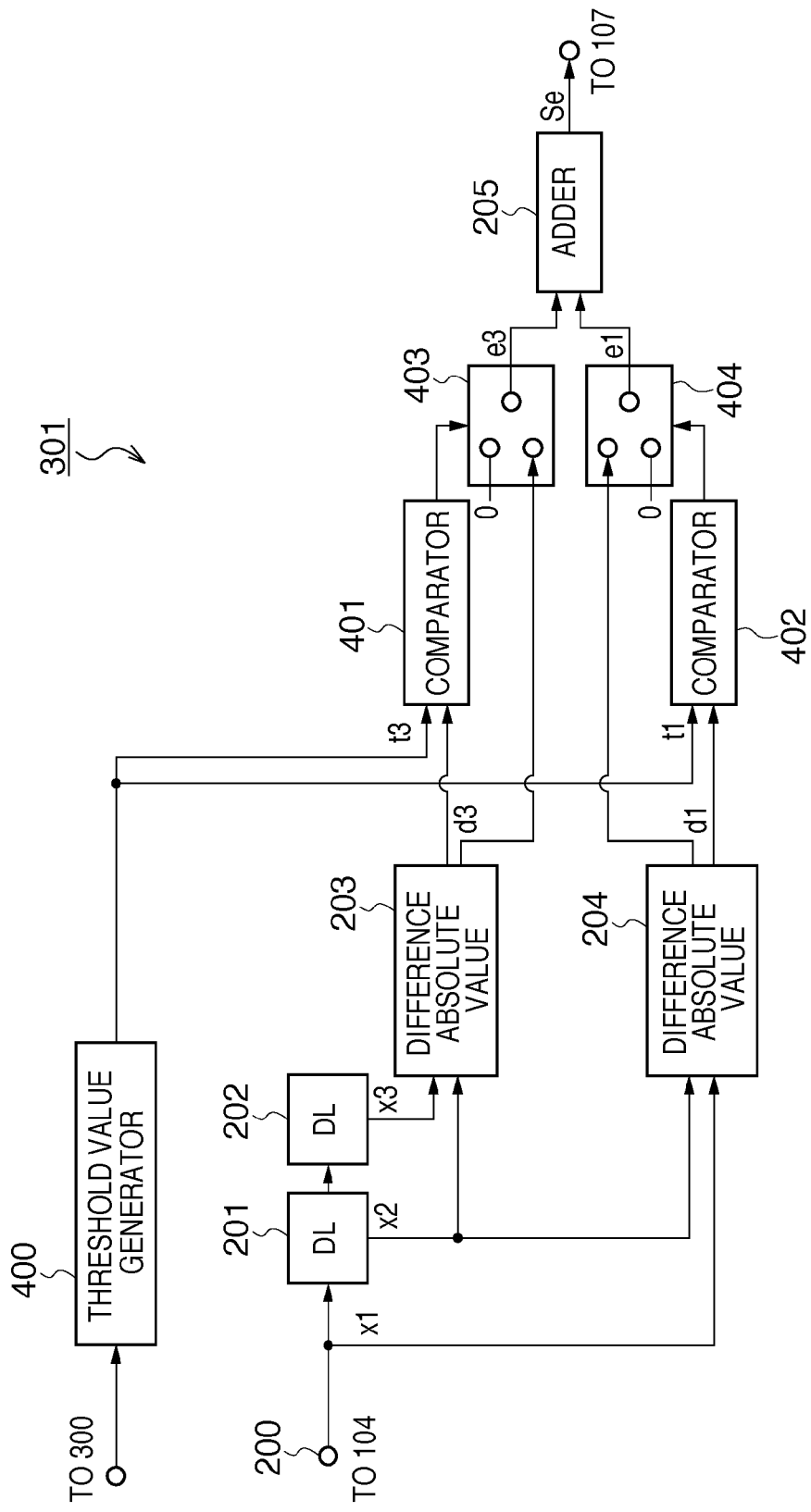
FIG. 2 is a diagram illustrating an example of the configuration of a high-precision edge map generator 301 according to the first embodiment.

Next, the details of the high-precision edge map generator 301 will be described with reference to FIG. 2, which is a diagram illustrating an example of the configuration of the high-precision edge map generator 301 according to the first embodiment.

Figure 3:
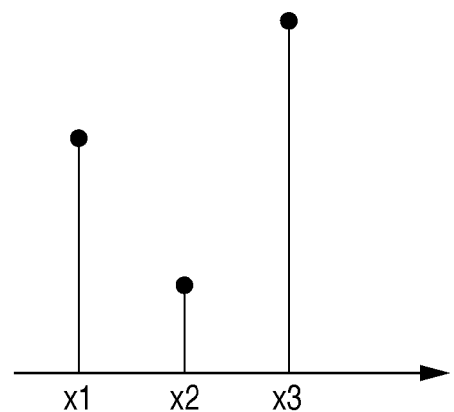
FIG. 3 is a diagram illustrating the relationship among pixels of three horizontal taps.

The digital image data that has accumulated in the block line buffer 104 is input to the high-precision edge map generator 301 in the order of the raster. Delay elements DL1 (201) and DL2 (202) each apply a delay of one pixel. A pixel x2 of interest, which will undergo filtering, is stored in the delay element DL1. A pixel signal x3 that is one pixel to the right of the pixel of interest is stored at input terminal 200, and a pixel x1 that is one pixel to the left of the pixel of interest is stored in the delay element DL2. Thus, the high-precision edge map generator 301 is so arranged that reference can be had to pixels at three horizontal taps. FIG. 3 is a diagram illustrating the relationship among pixels of three horizontal taps. In FIG. 3, the horizontal axis is a plot of pixel position and the vertical axis is a plot of pixel value.

Figure 4:
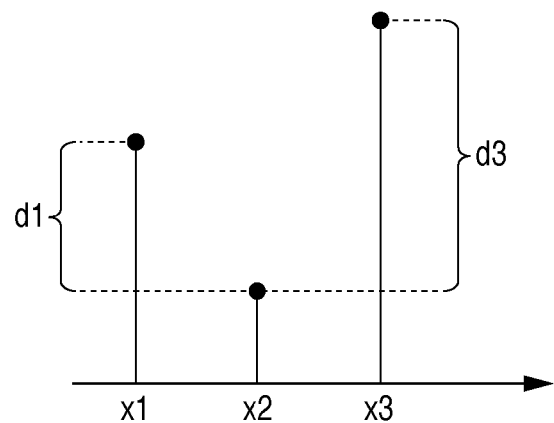
FIG. 4 is a diagram illustrating difference absolute values of pixels of three horizontal taps.

Difference absolute value computation circuits 203, 204 function as difference computation means, respectively compute absolute values d1, d3, shown in FIG. 4, of the differences between the pixel of interest and the two pixels on the left and right sides thereof and output the absolute values to comparison circuits 401, 402, respectively. FIG. 4 is a diagram illustrating difference absolute values of pixels of three horizontal taps. The comparison circuits 401, 402 output logical "1" if the inputs from the difference absolute value computation circuits 203, 204 are greater than threshold values that enter from a threshold value generator 400, and output logical "0" otherwise.

Figure 5:
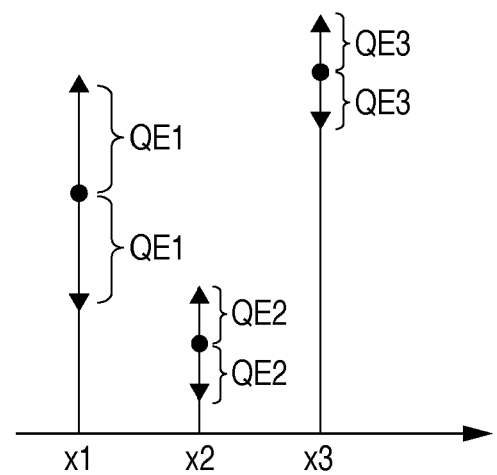
FIG. 5 is a diagram illustrating quantization errors of pixels of three horizontal taps.

The threshold value generator 400 generates threshold values ti (i=1, 3), which are used by the comparison circuits 401, 402, from pixel-by-pixel quantization errors QE1, QE2, QE3 shown in FIG. 5 and generated by the control signal generator 300. FIG. 5 is a diagram illustrating quantization errors of pixels of three horizontal taps. The threshold values utilized in the comparison with the pixels x1, x2 to be processed are computed in such a manner that t1=QE1+QE2, t3=QE3+QE2, respectively, will hold. In other words, t1 and t3 are the totals of the quantization error of the pixel of interest and the quantization errors of the peripheral pixels situated peripheral to the pixel of interest.

Selection circuits 403, 404 output logical "0" to an adding circuit 205 if the inputs from the comparison circuits 401, 402 are logical "0", and output the inputs from the difference absolute value computation circuits 203, 204 to the adding circuit 205 as is if the inputs from the comparison circuits 401, 402 are logical "1". The adding circuit 205 adds the input values and outputs the sum to the processed-pixel determination unit 107.

By virtue of the arrangement described above, the image processing apparatus according to this embodiment is capable of applying mosquito-noise reduction processing only to the vicinity of an edge that existed prior to encoding and not to a false edge produced by encoding.

Figure 6:
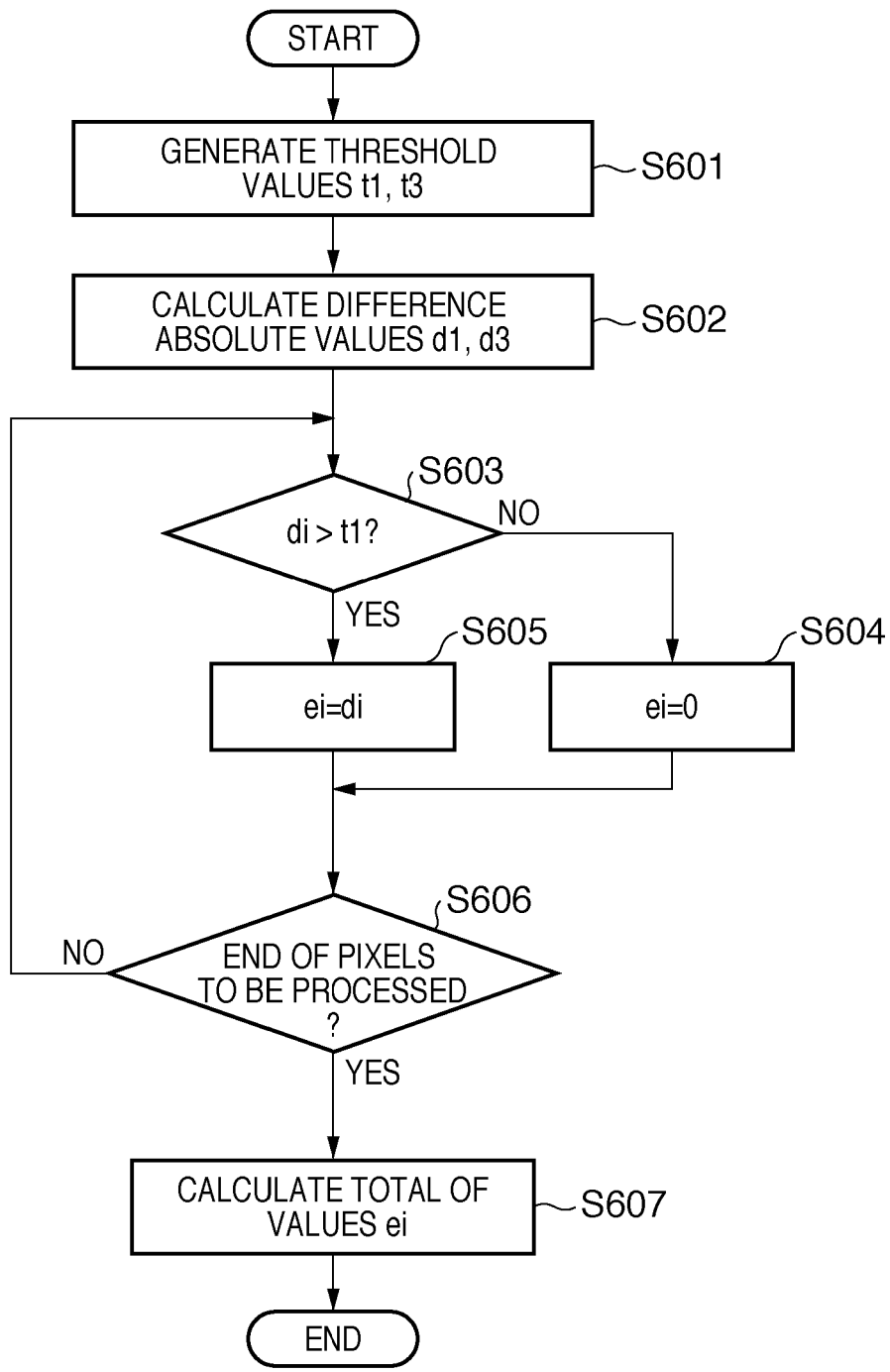
FIG. 6 is a flowchart illustrating processing for generating an edge map according to the first embodiment.

The processing executed by the high-precision edge map generator 301 in this embodiment will now be described with reference to the flowcharts of FIGS. 2 and 6. FIG. 6 is a flowchart illustrating processing for generating an edge map according to the first embodiment. The processing described below is under the overall control of the high-precision edge map generator 301.

When processing starts, the high-precision edge map generator 301 generates the threshold values t1, t3 from the pixel-by-pixel quantization error information using the threshold value generator 400 at step S601. Next, at step S602, the high-precision edge map generator 301 uses the difference absolute value computation circuits 203, 204 to calculate the absolute value d1 of the difference between the pixels x1, x2 to be processed and the absolute value d3 of the difference between the pixels x3, x2 to be processed.

Next, at step S603, the high-precision edge map generator 301 compares the difference absolute values di (i=1, 3) and the corresponding threshold values ti (i=1, 3), using the comparison circuits 401, 402. If the result of the comparison is that di>ti holds, control proceeds to step S605 and output value ei is made di (ei=di). On the other hand, if di≤ti holds, control proceeds to step S604 and output value ei is made 0 (ei=0). At step S606, the high-precision edge map generator 301 determines whether or not all comparison operations regarding the pixels xi (i=1, 3) to be processed have been completed. If the determination is "YES", control proceeds to step S607. Here the high-precision edge map generator 301 uses the adding circuit 205 to calculate the total of the output values ei from the comparison circuits 401, 402 and outputs the total value to the processed-pixel determination unit 107.

Thus, as described above, the image processing apparatus according to this embodiment makes it possible to precisely detect, in pixel units, an edge that existed prior to encoding, and is capable of improving the precision of post-processing using an edge. It should be noted that the accuracy of edge detection may be adjusted by applying a multiplier to the output from the threshold value generator 400. Further, filtering may be applied in the vertical direction or may be applied in the horizontal and vertical directions.

<Second Embodiment>

Next, a second embodiment of the present invention will be described with reference to FIGS. 7 to 9. In this embodiment, the high-precision edge map generator 301 of the first embodiment is changed to a high-speed edge map generator 600. Accordingly, the description that follows will deal mainly with the high-speed edge map generator 600, which distinguishes this embodiment from the first embodiment.

Figure 7:
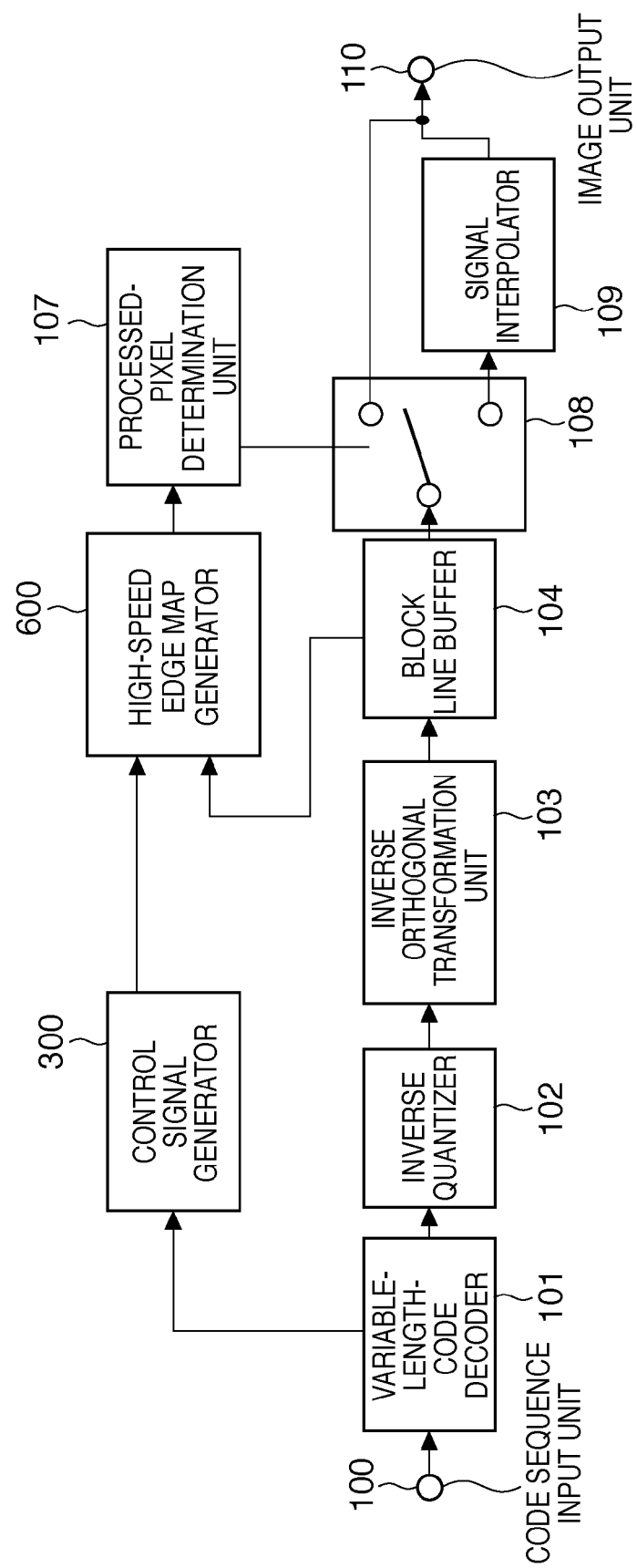
FIG. 7 is a diagram illustrating an example of the configuration of an image processing apparatus according to a second embodiment of the present invention.

FIG. 7 is the image processing apparatus according to the second embodiment. Blocks in FIG. 7 similar to those of the first embodiment shown in FIG. 1 are designated by like block numbers and need not be described again. As illustrated in FIG. 7, the image processing apparatus of this embodiment is equipped with the high-speed edge map generator 600 in place of the high-precision edge map generator 301. The details of the high-speed edge map generator 600 will be described later with reference to FIG. 8. Blocks in FIG. 8 similar to those of the first embodiment are designated by like block numbers and need not be described again.

Figure 8:
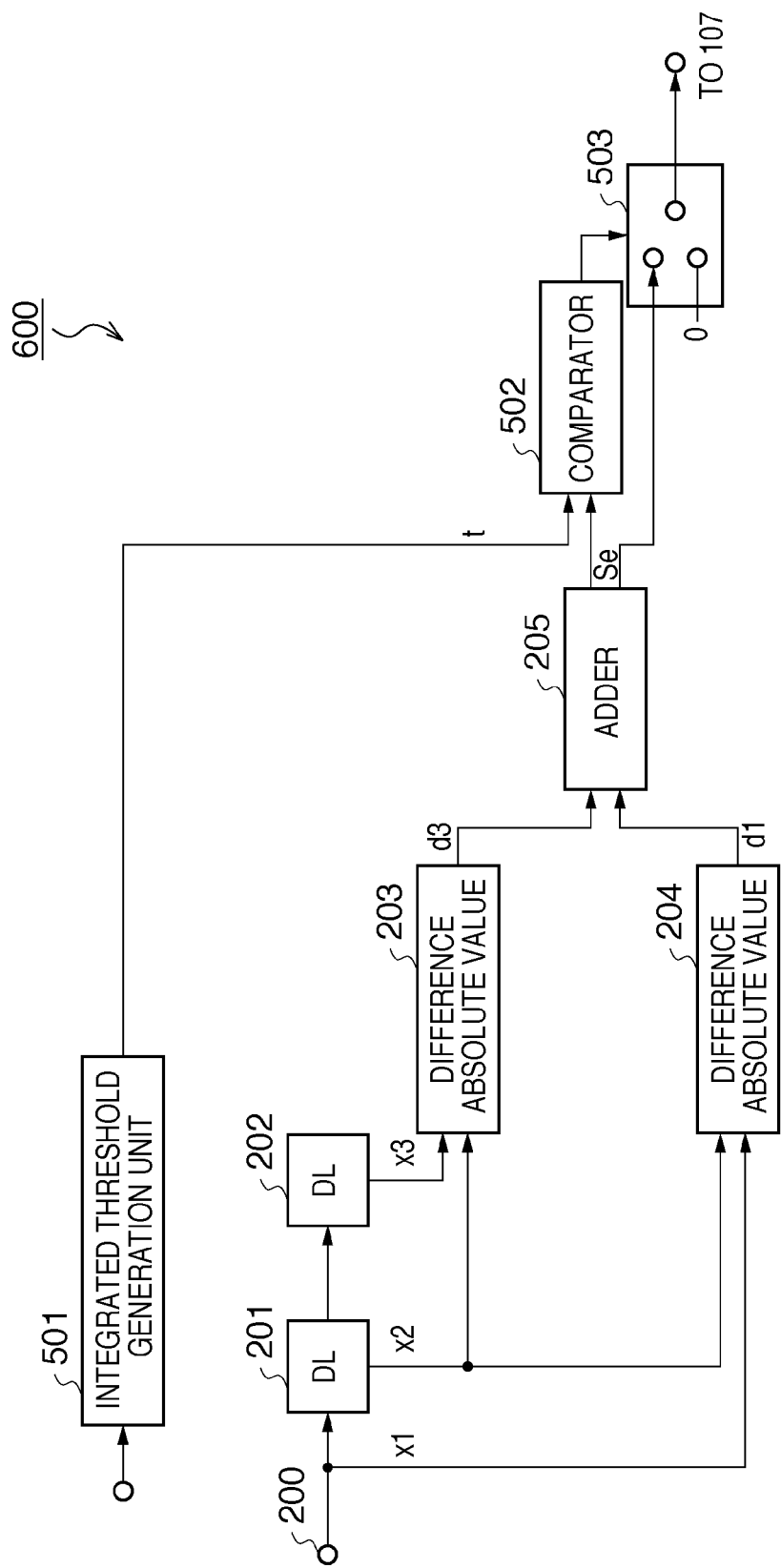
FIG. 8 is a diagram illustrating an example of the configuration of a high-speed edge map generator 600 according to the second embodiment.
Figure 9:
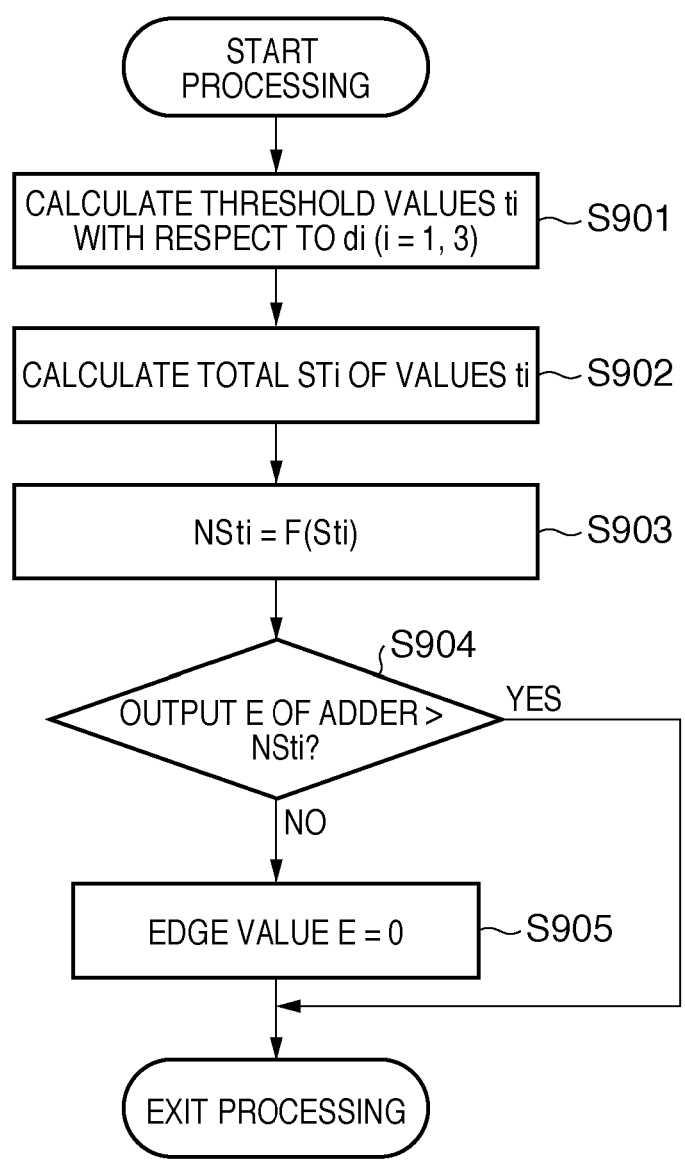
FIG. 9 is a flowchart illustrating processing for generating an edge map according to the second embodiment.

FIG. 8 is a diagram illustrating an example of the configuration of the high-speed edge map generator 600 according to the second embodiment. Blocks in FIG. 8 similar to those of the first embodiment shown in FIG. 2 are designated by like block numbers and need not be described again.

The digital image data that has accumulated in the block line buffer 104 is input to the high-speed edge map generator 600 is raster order. Delay elements DL1 (201) and DL2 (202) each apply a delay of one pixel. A pixel x2 of interest, which will undergo filtering, is stored in the delay element DL1. A pixel signal x3 that is one pixel to the right of the pixel of interest is stored at input terminal 200, and a pixel x1 that is one pixel to the left of the pixel of interest is stored in the delay element DL2. Thus, the high-speed edge map generator 600 is so arranged that reference can be had to pixels at three horizontal taps.

The difference absolute value computation circuits 203, 204 compute absolute values of the differences between the pixel of interest and the two pixels on the left and right sides thereof and output the absolute values to the adding circuit 205. The adding circuit 205 adds the input values and outputs the sum to a comparison circuit 502. The comparison circuit 502 outputs logical "1" if the input from the adding circuit 205 is greater than a threshold value that enters from an integrated threshold generation unit 501, and outputs logical "0" otherwise.

The integrated threshold generation unit 501 generates threshold values ti (i=1, 3), which are used by the comparison circuit 502, from pixel-by-pixel quantization errors QE1, QE2, QE3. The threshold values utilized in the comparison with the pixels x1, x2 to be processed are computed in such a manner that t1=QE1+QE2, t3=QE3+QE2, respectively, will hold. When each threshold value is calculated, the integrated threshold generation unit 501 outputs a total value t of each of the threshold values to the comparison circuit 502.

A selection circuit 503 outputs logical "0" to the processed-pixel determination unit 107 if the input from the comparison circuit 502 is logical "0", and outputs the input from the adding circuit 205 to the processed-pixel determination unit 107 as is if the inputs from the comparison circuit 502 logical "1".

The processing executed by the high-speed edge map generator 600 in this embodiment will now be described with reference to the flowcharts of FIGS. 8 and 9. FIG. 9 is a flowchart illustrating processing for generating an edge map according to the second embodiment. The processing described below is under the overall control of the high-speed edge map generator 600.

When processing starts, the integrated threshold generation unit 501 generates the threshold values t1, t3 from the pixel-by-pixel quantization error information at step S901. Next, at step S902, the integrated threshold generation unit 501 calculates the total value Sti (i=1, 3) of the threshold values t1, t3 generated at step S901. At step S903, the integrated threshold generation unit 501 multiplies Sti by a value N, which is less than or equal to one, generates NSti and outputs NSti to the comparison circuit 502. Further, concurrent with step S903, absolute values d1, d3 of the differences are generated by the difference absolute value computation circuits 203, 204. Furthermore, the results from the difference absolute value computation circuits 203, 204 are added by the adding circuit 205 and the sum E is output to the comparison circuit 502.

Next, at step S904, the comparison circuit 502 compares the total value E of the difference absolute values d1, d3, which is output from the adding circuit 205, with NSti that is output from the integrated threshold generation unit 501. If E>NSti holds, the output value is made the edge value (e.g., one) and is output to the processed-pixel determination unit 107. On the other hand, if E≤NSti holds, the output value is made zero and is output to the processed-pixel determination unit 107.

Thus, as described above, the image processing apparatus according to this embodiment makes it possible to apply mosquito-noise reduction processing solely to the vicinity of an edge that existed prior to encoding and not to a false edge produced by encoding, and also makes it possible to execute processing at high speed.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-283728, filed on Nov. 4, 2008, which is hereby incorporated by reference herein in its entirety.

What is claimed is:

1. An image processing apparatus comprising:
a decoding unit that decodes encoded image data;
a quantization error calculating unit that acquires quantization information, which relates to quantization when said decoding unit decodes the image data, and calculates pixel-by-pixel quantization error;
an edge map generating unit that generates an edge map, which represents whether or not each pixel is an edge portion, using the decoded image data and the calculated quantization error;
a determination unit that determines whether or not noise is included in a pixel of interest that is to be processed, using the generated edge map; and
a correction unit that corrects the image data of a pixel of interest which has been determined to include noise by said determination unit; and
wherein said edge map generating unit includes:
an input unit that inputs the value of the pixel of interest and values of a plurality of peripheral pixels situated in the vicinity of the pixel of interest;
a difference calculating unit that calculates difference absolute values between the pixel of interest and each of the peripheral pixels;
a threshold value generating unit that generates a threshold value for every peripheral pixel from the quantization error, the threshold value indicating whether or not the pixel is an edge portion;
a comparison unit that compares each calculated difference absolute value and each respective generated threshold value;
a selecting unit that, if the difference absolute value is greater than the threshold value, selects this difference absolute value as an output value, and that, if the difference absolute value is equal to or less than the threshold value, selects a prescribed value as an output value; and
an adding unit that adds the output values, which have been selected for every difference absolute value, as the value of the pixel of interest in the edge map.

2. The apparatus according to claim 1, wherein if the edge map indicates that the value of the pixel of interest is not an edge portion and that the value of at least one peripheral pixel situated in the vicinity of the pixel of interest is an edge portion, said determination unit determines that the pixel of interest includes noise.

3. The apparatus according to claim 1, wherein said threshold value generating unit generates the total of the quantization error of the pixel of interest and the quantization errors of peripheral pixels situated in the vicinity of the pixel of interest as the threshold value.

4. The apparatus according to claim 1, wherein the encoded image data is data that has undergone block compressive encoding.

5. An image processing apparatus comprising:
a decoding unit that decodes encoded image data;
a quantization error calculating unit that acquires quantization information, which relates to quantization when said decoding unit decodes the image data, and calculates pixel-by-pixel quantization error;
an edge map generating unit that generates an edge map, which represents whether or not each pixel is an edge portion, using the decoded image data and the calculated quantization error;
a determination unit that determines whether or not noise is included in a pixel of interest that is to be processed, using the generated edge map; and
a correction unit that corrects the image data of a pixel of interest which has been determined to include noise by said determination unit; and
wherein said edge map generating unit includes:
an input unit that inputs the value of the pixel of interest and values of a plurality of peripheral pixels situated in the vicinity of the pixel of interest;
a difference calculating unit that calculates difference absolute values between the pixel of interest and each of the peripheral pixels;
an adding unit that adds the calculated difference absolute values;
a threshold value generating unit that generates a threshold value for every peripheral pixel from the quantization error, the threshold value indicating whether or not the pixel is an edge portion, and that outputs a total value of the generated threshold values;
a comparison unit that compares a total value of the added difference absolute values and the total value of the generated threshold values, respectively; and
a selecting unit that, if the difference absolute value is greater than the threshold value, selects this difference absolute value as the value of the pixel of interest in the edge map, and that, if the difference absolute value is equal to or less than the threshold value, selects a prescribed value as the value of the pixel of interest in the edge map.

6. A method of controlling an image processing apparatus comprising:
a decoding step of decoding encoded image data;
a quantization error calculating step of acquiring quantization information, which relates to quantization when the image data is decoded at said decoding step, and calculating pixel-by-pixel quantization error;

an edge map generating step of generating an edge map, which represents whether or not each pixel is an edge portion, using the decoded image data and the calculated quantization error;

a determination step of determining whether or not noise is included in a pixel of interest that is to be processed, using the generated edge map; and a correcting step of correcting the image data of a pixel of interest which has been determined to include noise at said determination step, wherein a processor carries out said decoding, quantization error calculating, edge map generating, determination and correcting steps, and wherein said edge map generating step includes:

an input step of inputting the value of the pixel of interest and values of a plurality of peripheral pixels situated in the vicinity of the pixel of interest;

a difference calculating step of calculation difference absolute values between the pixel of interest and each of the peripheral pixels;

a threshold value generating step of generating unit a threshold value for every peripheral pixel from the quantization error, the threshold value indicating whether or not the pixel is an edge portion;

a comparison step of comparing each calculated difference absolute value and each respective generated threshold value;

a selecting step of, if the difference absolute value is greater than the threshold value, selecting this difference absolute value as an output value, and, if the difference absolute value is equal to or less than the threshold value, selecting a prescribed value as an output value; and an adding step of adding the output values, which have been selected for every difference absolute value, as the value of the pixel of interest in the edge map.

7. A non-transitory computer-readable medium storing a computer program for causing a computer to execute each step in the method of controlling the image processing apparatus according to claim 6.

8. A method of controlling an image processing apparatus comprising:

a decoding step of decoding encoded image data;

a quantization error calculating step of acquiring quantization information, which relates to quantization when the image data is decoded at said decoding step, and calculating pixel-by-pixel quantization error;

an edge map generating step of generating an edge map, which represents whether or not each pixel is an edge portion, using the decoded image data and the calculated quantization error;

a determination step of determining whether or not noise is included in a pixel of interest that is to be processed, using the generated edge map; and a correcting step of correcting the image data of a pixel of interest which has been determined to include noise at said determination step, wherein a processor carries out said decoding, quantization error calculating, edge map generating, determination and correcting steps, and wherein said edge map generating step includes:

an input step of inputting the value of the pixel of interest and values of a plurality of peripheral pixels situated in the vicinity of the pixel of interest;

a difference calculating step of calculating that difference absolute values between the pixel of interest and each of the peripheral pixels;

an adding step of adding the calculated difference absolute values;

a threshold value generating step of generating a threshold value for every peripheral pixel from the quantization error, the threshold value indicating whether or not the pixel is an edge portion, and that outputs a total value of the generated threshold values;

a comparison step of comparing a total value of the added difference absolute values and the total value of the generated threshold values, respectively; and a selecting step of, if the difference absolute value is greater than the threshold value, selecting this difference absolute value as the value of the pixel of interest in the edge map, and, if the difference absolute value is equal to or less than the threshold value, selecting a prescribed value as the value of the pixel of interest in the edge map.

9. A non-transitory computer-readable medium storing a computer program for causing a computer to execute each step in the method of controlling the image processing apparatus according to claim 8.

* * * * *